US012608986B2

(12) United States Patent
Tamao et al.

(10) Patent No.: US 12,608,986 B2
(45) Date of Patent: Apr. 21, 2026

(54) INFORMATION PROCESSING DEVICE

(71) Applicant: TOYOTA JIDOSHA KABUSHIKI KAISHA, Toyota (JP)

(72) Inventors: Junichiro Tamao, Tokyo (JP); Ryota Nakabayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/606,426

(22) Filed: Mar. 15, 2024

(65) Prior Publication Data

US 2025/0069454 A1 Feb. 27, 2025

(30) Foreign Application Priority Data

Aug. 23, 2023 (JP) .................................. 2023-135415

(51) Int. Cl.
*G07C 5/08* (2006.01)
*G06F 1/26* (2006.01)

(52) U.S. Cl.
CPC ............. *G07C 5/085* (2013.01); *G06F 1/263* (2013.01)

(58) Field of Classification Search
CPC ....... G07C 5/085; G06F 1/263; G06F 3/0655; G06F 3/0679; G06F 3/0619; G06F 3/061; G06F 3/0656; G06F 13/1673
See application file for complete search history.

(56) References Cited

U.S. PATENT DOCUMENTS

| | | | | |
|---|---|---|---|---|
| 12,164,798 | B2 * | 12/2024 | Kitajima | ............... G06F 3/0655 |
| 12,277,027 | B2 * | 4/2025 | Ishii | ......................... G06F 12/00 |
| 2019/0163402 | A1 * | 5/2019 | Yamauchi | ............. G06F 3/0679 |
| 2022/0083276 | A1 | 3/2022 | Subbarao et al. | |
| 2023/0153029 | A1 | 5/2023 | Park et al. | |
| 2023/0205457 | A1 | 6/2023 | Porzio et al. | |
| 2023/0367482 | A1 * | 11/2023 | Xie | ......................... G06F 3/0685 |

FOREIGN PATENT DOCUMENTS

JP        2016-009457 A        1/2016

* cited by examiner

*Primary Examiner* — Rami Khatib
(74) *Attorney, Agent, or Firm* — SoraIP, Inc.

(57) ABSTRACT

An information processing device manages a storage device mounted on a vehicle and rewritable on a cell-by-cell basis, and is configured to: collect data at a collection timing from each of a plurality of applications that is executed in the vehicle; integrate a plurality of pieces of the collected data into a single piece of integrated data; execute a first command that is a command requesting writing of the integrated data to the storage device; and execute a second command that is a command to immediately execute the writing of the integrated data to the storage device based on the first command.

4 Claims, 3 Drawing Sheets

INFORMATION PROCESSING DEVICE

CROSS-REFERENCE TO RELATED APPLICATION

This application claims priority to Japanese Patent Application No. 2023-135415 filed on Aug. 23, 2023, incorporated herein by reference in its entirety.

BACKGROUND

1. Technical Field

The present disclosure relates to information processing devices.

2. Description of Related Art

In recent years, NAND flash memories have been widely used as storage devices such as universal serial bus (USB) memories, safe driver (SD) cards, and flash solid state drives (SSDs). Japanese Unexamined Patent Application Publication No. 2016-9457 (JP 2016-9457 A) describes a technique of merging write data before writing the data in order to efficiently use a storage area of a cache memory that is used for a write process to a NAND flash memory.

SUMMARY

The number of write operations to a NAND flash memory is limited. Therefore, in an information processing device with a NAND flash memory, it is preferable to reduce the frequency of writing data to the memory.

An information processing device that achieves the above object is an information processing device that manages a storage device mounted on a vehicle and rewritable on a cell-by-cell basis. The information processing device is configured to collect data at a collection timing from each of a plurality of applications that is executed in the vehicle, integrate a plurality of pieces of the collected data into a single piece of integrated data, execute a first command, the first command being a command requesting writing of the integrated data to the storage device, and execute a second command, the second command being a command to immediately execute the writing of the integrated data to the storage device based on the first command.

According to the present disclosure, it is possible to reduce the frequency of writing data to a storage device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, an embodiment of an information processing device will be described with reference to FIGS. 1 to 3.

Overall Configuration of the Vehicle 1

Figure 1:
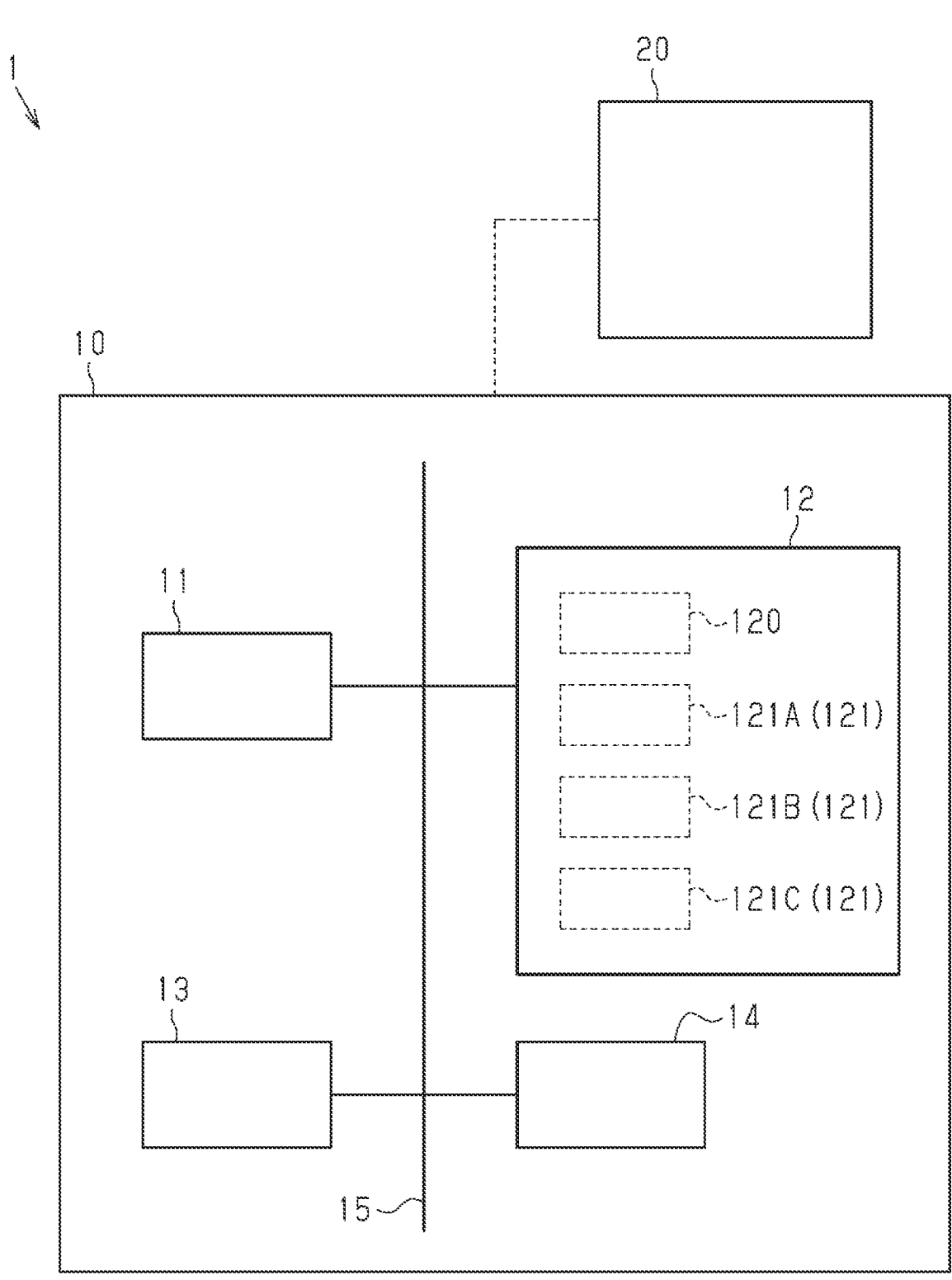
FIG. 1 is a diagram used for describing a vehicle equipped with an information processing device.

As illustrated in FIG. 1, the vehicle 1 includes, for example, an information processing device 10 and a power supply device 20 that supplies power to the information processing device 10. The information processing device 10 is, for example, a computer including a Central Processing Unit (CPU) 11, a Read Only Memory (ROM) 12, a Random Access Memory (RAM) 13, and a storage device 14. Various configurations included in the information processing device 10 can communicate with each other via the internal bus 15.

ROM 12 stores a plurality of programs to be executed in the vehicles 1. The information processing device 10 realizes various functions by CPU 11 executing the respective programs. Here, the "function" includes a function related to the traveling of the vehicle 1, a function of automatically updating the firmware of the vehicle 1, and the like. Hereinafter, it is assumed that ROM 12 stores in advance a program for realizing the integrated application 120 for implementing the data-integration function, a program for realizing an application 121A for implementing the first function, a program for realizing an application 121B for implementing the second function, and a program for realizing an application 121C for implementing the third function. It should be noted that the program stored in ROM 12 is exemplary, and is not limited thereto. In the following explanation, the application 121A, the application 121B, and the application 121C are simply referred to as the application 121 when the application 121A, the application 121B, and the application 121C are not distinguished from each other.

The storage device 14 can store various programs and various data. The storage device 14 is a non-volatile memory capable of electrically rewriting data on a cell-by-cell basis. Specifically, the storage device 14 is realized by a NAND flash memory. Therefore, the storage device 14 has an upper limit number of writes. The number of times of writing to the storage device 14 corresponds to the number of times of writing some kind of data to the same memory cell. Therefore, "writing" includes not only writing information to an empty memory cell but also overwriting stored contents of a memory cell in which information has already been written.

The power supply device 20 supplies electric power to various devices mounted on the vehicle 1. A constant power supply mode and an auxiliary power supply mode are prepared as a supply mode for supplying power from the power supply device 20. For example, when the user is not located near the vehicle 1 while the vehicle is stopped, the constant power supply mode is selected as the supply mode. On the other hand, when the user approaches the vehicle 1 in a situation where the constant power supply mode is selected, the supply mode is changed from the constant power supply mode to the auxiliary power supply mode.

The constant power supply mode is a mode in which power is supplied to part of in-vehicle devices even when the power supply of the vehicle 1 is off. When the constant power supply mode is selected as the supply mode, power is supplied from the power supply device 20 to the information processing device 10 and the security device of the vehicle 1. On the other hand, when the auxiliary power supply mode is selected as the supply mode, the number of in-vehicle devices to which power is supplied from the power supply device 20 is increased compared to when the constant power supply mode is selected as the supply mode. The "in-vehicle devices" as used herein include both an electronic control device such as the information processing device 10 and an in-vehicle actuator.

About Integrated Application 120: Write Processing

Hereinafter, a write process of the integrated application 120 will be described. The integrated application 120 collects data to be written at a collection timing from each of a plurality of programs executed by CPU 11. In one embodiment, the plurality of programs is an application 121A, an application 121B, and an application 121C.

Here, in general, data used for each application 121 realized in the vehicle 1, which is highly important in the control of the vehicle 1, is required to be appropriately stored in the storage device 14 at the collection timing. The high-importance data includes, for example, total travel distance information, power management information, storage-related metadata, diagnosis information, and the like. Note that the data with high importance is an example and is not limited to this. The collection timing is, for example, a timing at which the power switch of the vehicle 1 is turned off. An example of a power switch is an ignition switch.

The integrated application 120 integrates the data collected from the plurality of application 121A, 121B, 121C at the collection timing into one integrated data. The integrated application 120 executes a first command for the integrated data. The first command is a command for requesting writing of designated data to the storage device 14.

When the first command is executed, the designated data is written to the storage device 14. On the other hand, the data write timing is not strictly immediate. The data is written at a predetermined timing. Therefore, one or more pieces of data specified by the first command are written to the storage device 14 at one time at the next write timing after the write process is performed at a predetermined timing until the next write process is performed. Therefore, when various factors such as an instantaneous interruption of the power supply device 20 and an impact on the vehicle 1 occur during a period from the time when the first command is executed until the writing process is actually performed, there is a possibility that the data designated by the first command is not written to the storage device 14.

Therefore, the integrated application 120 executes the first command and then executes the second command. The second command is a command that causes the storage device 14 to immediately execute writing of designated data performed when the first command is executed.

About the Integrated Application 120: Read Processing

Hereinafter, a process of reading the integrated application 120 will be described. In general, high-importance data is required to be appropriately read from the storage device 14 at the read timing. The read timing is, for example, a timing at which the power switch of the vehicle 1 is turned on. The integrated application 120 reads the integrated data from the storage device 14 at the read timing. The integrated application 120 outputs each piece of data included in the read integrated data to a corresponding program. For example, each piece of data collected from each application 121 includes identification information capable of identifying the corresponding application 121. The integrated application 120 identifies the corresponding application 121 based on the identification information in each piece of data included in the integrated data, and outputs the data to the identified application 121.

Write Check Flag

The write check flag will be described below. As described above, the writing process to the storage device 14 is executed by the first command and the second command. As described above, the writing process may fail due to various factors such as an instantaneous interruption of the power supply device 20 and an impact on the vehicle 1. The integrated application 120 causes the storage device 14 to store a write check flag indicating whether the write process was successful. The integrated application 120 manages the information stored in the storage device 14 based on the write check flag.

The integrated application 120 turns OFF the write acknowledge flag at the collection timing. After the execution of the second command at the collection timing, the integrated application 120 acquires a return value indicating the execution result of the second command. The return value of the second command indicates whether the write process to the storage device 14 was successful. When the acquired return value indicates that the write process to the storage device 14 failed, the integrated application 120 does not update the write check flag and keeps the write check flag OFF. On the other hand, when the acquired return value indicates that the write process to the storage device 14 was successful, the integrated application 120 updates the write check flag to ON and stores the write check flag in the storage device 14. Through this processing, the write check flag indicates the execution result of the second command.

About the First State Information and the Second State Information

The first state information and the second state information will be described below. As described above, the process of writing data to the storage device 14 may fail. It is preferable that all of the data stored in the storage device 14 be integrated with data before the write process, rather than the inappropriate state associated with the failure. Here, the inappropriate state associated with the failure refers to a state in which part of the data remains as the data before the write process, and the remaining part has been updated with the data after the write process. That is, the atomicity of the data stored in the storage device 14 is preferably maintained.

Accordingly, the storage device 14 stores two pieces of information: the first state information, which is data before execution of the second command, and the second state information, which is data after execution of the second command. Specifically, the integrated application 120 causes the storage device 14 to store the integrated data as the second state information in accordance with execution of the second command. At this time, when the writing process of the second state information fails, the integrated application 120 does not update the first state information and leaves it as it is. On the other hand, when the writing process of the second state information was successful, the integrated application 120 updates the content of the first state information with the second state information.

The integrated application 120 acquires the write check flag from the storage device 14 at the read timing. Based on the acquired write check flag, the integrated application 120 determines whether or not the write process was successful at the previous collection timing. When the write check flag is OFF, the integrated application 120 reads the first state information because the integrated data as the second state information may be in an inappropriate state. That is, the integrated application 120 reads the integrated data stored in the storage device 14 before the execution of the previous write process. On the other hand, when the write check flag is ON, the integrated application 120 reads the second state information assuming that the integrated data as the second state information is appropriately stored.

Writing Process of the Information Processing Device 10

Figure 2:
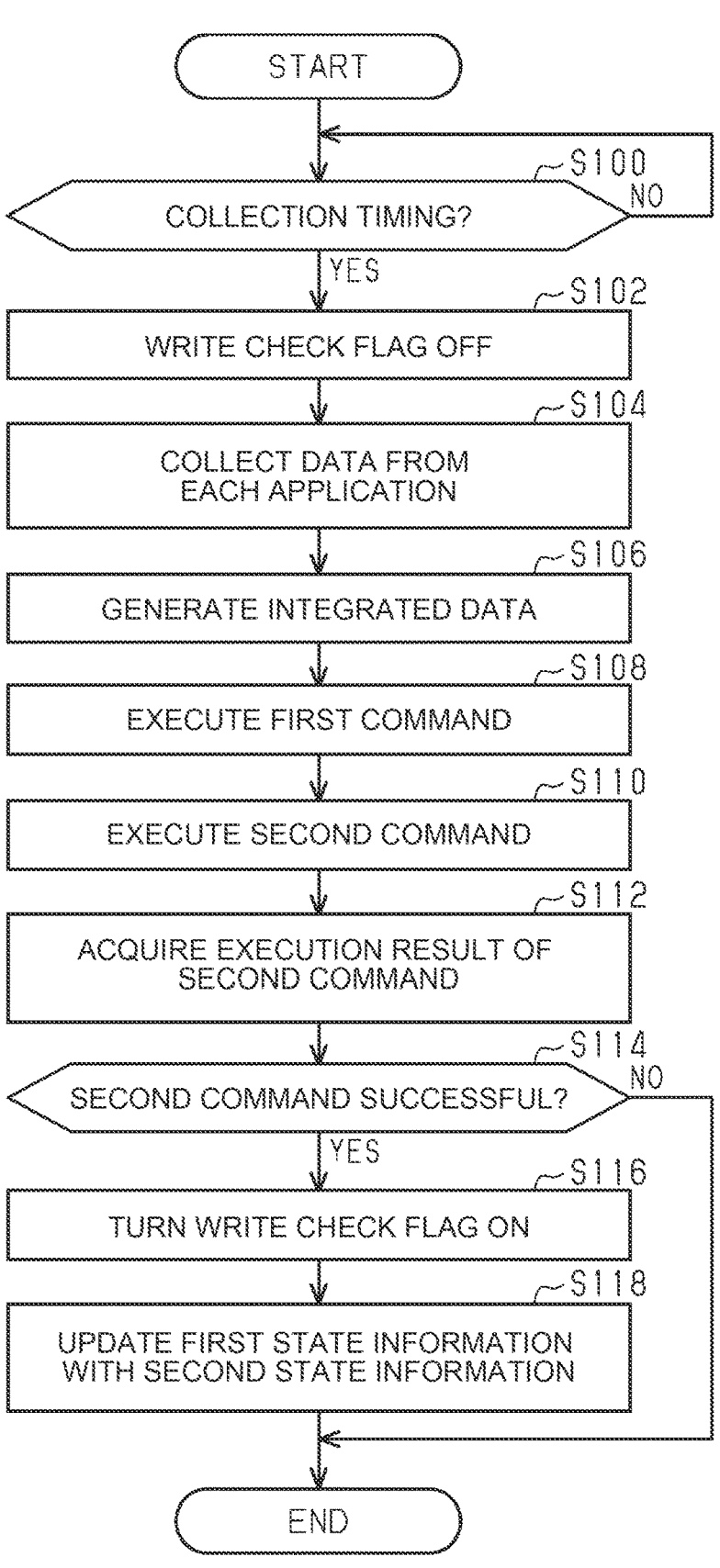
FIG. 2 is a flow chart used to describe a write process.

As illustrated in FIG. 2, the integrated application 120 determines whether or not it is a collection timing (S100). If the integrated application 120 determines that the timing is not the collection timing (S100: NO), the integrated application 120 repeats S100 determination process until the collection timing is reached. If the integrated application 120 determines that it is the collection timing (S100: YES), the integrated application 120 updates the write check flag to OFF (S102). The integrated application 120 then collects data form each of the applications 121 (S104). The integrated application 120 integrates the collected data into a single piece of integrated data (S106).

The integrated application 120 then executes the first command for the integrated data (S108). The integrated application 120 then executes the second command (S110). The integrated application 120 then acquires a return value indicating the execution result of the second command (S112). Next, the integrated application 120 determines based on the acquired return value whether the process of writing data to the storage device 14 was successful (S114). When the integrated application 120 determines that the write process failed (S114; NO), the integrated application 120 does not update the write check flag but keeps the write check flag OFF, and ends the series of processes. When the integrated application 120 determines that the write process was successful (S114; YES), the integrated application 120 updates the write check flag to ON (S116). The integrated application 120 then S118 the content of the first state information with the second state information.

Writing Process of the Information Processing Device 10

Figure 3:
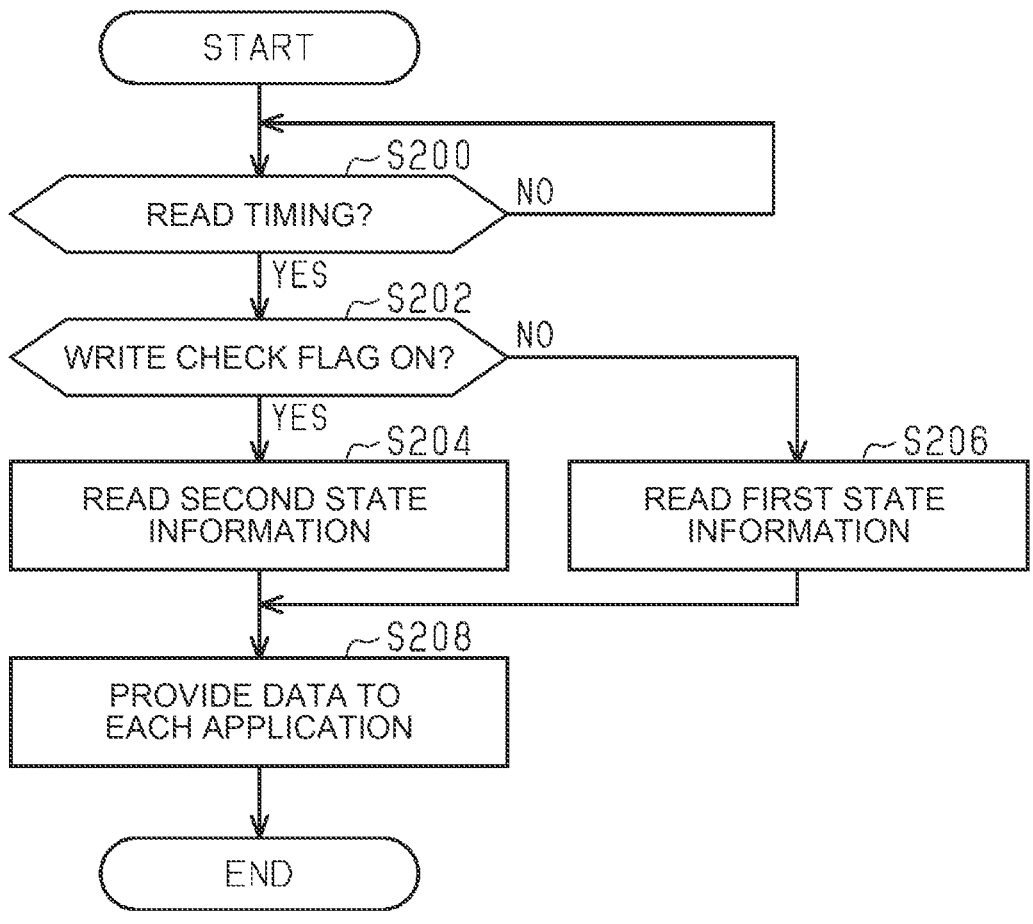
FIG. 3 is a flowchart used for describing the reading process.

As illustrated in FIG. 3, the integrated application 120 determines whether or not it is a read timing (S200). When the integrated application 120 determines that the read timing is not the read timing (S200: NO), the integrated application 120 repeats S200 determination process until the read timing is reached. When the integrated application 120 determines that it is the read timing (S200: YES), the integrated application 120 determines whether or not the write check flag acquired from the storage device 14 is ON (S202).

When the integrated application 120 determines that the write check flag is ON (S202; YES), the integrated application 120 reads the second state information on the integrated data as the second state information on the assumption that the write process has been appropriately performed (S204). If the integrated application 120 is such that the write check flag is OFF (S202; NO), the integrated application 120 reads the first state information (S206) because the integrated data as the second state information may be in an inappropriate state. The integrated application 120 provides each data included in the read integrated data to each corresponding application 121 (S208).

Operation and Effect of Embodiments

According to the above-described embodiment, the following functions and effects can be obtained.

(1) The information processing device 10 is a device that manages a storage device 14 mounted on the vehicle 1 and rewritable on a cell-by-cell basis. In CPU 11 of the information processing device 10, the integrated application 120 is executed. The integrated application 120 collects data at a collection timing from each of a plurality of applications 121 executed in the vehicle 1. The integrated application 120 integrates a plurality of pieces of the collected data into the integrated data. The integrated application 120 requests writing of the integrated data to the storage device 14 by executing the first command. The integrated application 120 executes the second command to immediately execute the writing of the integrated data to the storage device 14 based on the first command.

Here, in a case where the integrated application 120 does not integrate the data of each application 121, each application 121 performs a process of writing data to the storage device 14 at the collection timing. In this example, a case in which three applications 121 are implemented in the information processing device 10 has been described. The more functions, the more frequently the data writing process to the storage device 14 at the collection timing is performed. Therefore, when the data is not integrated, it is not possible to suppress an increase in the number of times of writing.

On the other hand, the integrated application 120 integrates a plurality of pieces of data into a single piece of integrated data. Then, at the collection timing, the storage device 14 performs a write process for only one of the integrated data integrated by the integrated application 120. As a result, the information processing device 10 can reduce the frequency of writing data to the storage device 14 as NAND flash memory.

As described above, the storage device 14 is a non-volatile memory capable of electrically rewriting data on a cell-by-cell basis. Here, when the capacity of the data written to the cell is sufficiently smaller than the storage capacity of the cell, the storage capacity of the cell becomes excessive. When the integrated application 120 does not integrate the data of each application 121, each application 121 performs a process of writing data to each cell of the storage device 14 at the collection timing. In this case, the storage device 14 is more likely to have an extra storage capacity of the cell than when the integrated data is stored.

According to this configuration, the information processing device 10 can efficiently use the storage area of the cell of the storage device 14 by storing the integrated data obtained by integrating the data of the plurality of applications 121 in the cell.

(2) The collection timing includes a timing at which the power switch of the vehicle 1 is turned off. In general, the application 121 implemented in the information processing device 10 executes a process of writing data to the storage device 14 when the power switch is turned off. According to this configuration, the information processing device 10 can suppress an increase in the number of times of writing data to the storage device 14 at a timing at which the writing process is generally performed.

(3) The integrated application 120 reads the integrated data from the storage device 14 at the read timing. The integrated application 120 provides data to each of the plurality of applications 121 based on the integrated data. The read timing includes a timing at which the power switch is turned on.

In general, the application 121 implemented in the information processing device 10 executes a process of reading data from the storage device 14 when the power switch is turned on. At this time, when each application 121 performs the data reading process, the waiting time for the reading process may be prolonged.

According to this configuration, the information processing device 10 can efficiently perform the reading process at a timing when the reading process is generally performed by reading the integrated data from the storage device 14 at once.

(4) The storage device 14 stores first state information indicating a state of the storage device 14 before execution of the second command and second state information indicating a state of the storage device 14 after execution of the second command. The integrated application 120 acquires a write check flag when reading the integrated data from the storage device 14. When the write check flag indicates that the second command was successful, the integrated application 120 reads the second state information. When the write check flag indicates the second command failed, the integrated application 120 reads the first state information. According to this configuration, the information processing device 10 can maintain the atomicity of the data stored in the storage device 14 even when the writing process fails.

The above embodiment may be modified as follows. Note that the above embodiment and the following examples may be combined as long as no technical inconsistency occurs.

The above description illustrates the case where the collection timing is the time when the power switch is turned off and the read timing is the time when the power switch is turned on. However, the present disclosure is not limited to this. The collection timing and the read timing may be other timings.

As described above, a constant power supply mode and an auxiliary power supply mode are prepared as the supply mode for supplying power from the power supply device 20. When the user approaches the vehicle 1, the power supply device 20 switches from the constant power supply mode to the auxiliary power supply mode, and when the user moves away from the vehicle 1, the power supply device switches from the auxiliary power supply mode to the constant power supply mode.

The collection timing may be a timing of switching from the auxiliary power supply mode to the constant power supply mode, or may be a timing of switching from the constant power supply mode to the auxiliary power supply mode. In general, the application 121 implemented in the information processing device 10 executes a process of writing data to the storage device 14 when the supply source of the voltage is changed. According to this configuration, the information processing device 10 can suppress an increase in the number of times of writing data to the storage device 14 at a timing at which the writing process is generally performed.

In a vehicle in which the constant power supply mode and the auxiliary power supply mode are prepared as the supply mode for supplying power from the power supply device 20, a physical power switch of the vehicle such as an ignition may not be provided.

The vehicle may be a vehicle in which an auxiliary power supply mode is not prepared as a supply mode for supplying power from the power supply device 20.

The above description illustrates the case where the vehicle 1 includes one information processing device 10. However, the present disclosure is not limited to this. The vehicle 1 may include a plurality of information processing devices 10. Here, the plurality of information processing devices 10 is connected by intra-vehicle communication such as Controller Area Network (CAN), Local Interconnect Network (LIN), FlexRay, and the like. Then, the integrated application 120 collects data from the application 121 implemented in the other information processing device 10 via in-vehicle communication, and writes integrated data obtained by integrating the collected data into the storage device 14.

At the collection timing, the data collected by the integrated application 120 may include not only high-importance data but also other data.

The application 121 other than the integrated application 120 stored in ROM 12 may be two or four or more as long as it is a plurality of applications 121.

What is claimed is:

1. An information processing device that manages a storage device mounted on a vehicle and rewritable on a cell-by-cell basis, the information processing device comprising:

a processor configured to collect pieces of data from each of a plurality of applications that are executed in the vehicle at a collection timing;

integrate the pieces of the data collected from the plurality of applications at the collection timing into a single piece of integrated data;

execute a first command, the first command being a command requesting writing of the integrated data to the storage device; and execute a second command, the second command being a command to immediately execute the writing of the integrated data to the storage device based on the first command, wherein a constant power supply mode and an auxiliary power supply mode are prepared as a supply mode for supplying power, the number of in-vehicle devices to which power is supplied from a power supply is larger when the auxiliary power supply mode is selected as the supply mode than when the constant power supply mode is selected as the supply mode, the supply mode is switched from the constant power supply mode to the auxiliary power supply mode when a user approaches the vehicle, and the supply mode is switched from the auxiliary power supply mode to the constant power supply mode when the user moves away from the vehicle, and the collection timing includes a timing at which the supply mode is switched from the auxiliary power supply mode to the constant power supply mode.

2. The information processing device according to claim 1, wherein the collection timing includes a timing at which a power switch of the vehicle is turned off.

3. The information processing device according to claim 1, wherein the processor is further configured to read the integrated data from the storage device at a read timing, and provide the data to each of the applications based on the integrated data.

4. The information processing device according to claim 1, wherein the storage device stores first state information and second state information, the first state information indicating a state of the storage device before execution of the second command, and the second state information indicating a state of the storage device after execution of the second command, and the processor is further configured to acquire an execution result of the second command when reading the integrated data from the storage device, wherein the processor reads the second state information when the execution result indicates that the second command was successful, and the processor reads the first state information when the execution result indicates the second command failed.

* * * * *